US007567680B2

(12) United States Patent
Murray et al.

(10) Patent No.: US 7,567,680 B2
(45) Date of Patent: Jul. 28, 2009

(54) DUAL-DIAPHRAGM SPEAKER ASSEMBLIES WITH ACOUSTIC PASSAGEWAYS AND MOBILE TERMINALS INCLUDING THE SAME

(75) Inventors: Matthew Justin Murray, Raleigh, NC (US); Kirsten Finley, Durham, NC (US); William Chris Eaton, Cary, NC (US)

(73) Assignee: Sony Ericsson Mobile Communications, AB, Lund (SE)

( * ) Notice: Subject to any disclaimer, the term of this patent is extended or adjusted under 35 U.S.C. 154(b) by 924 days.

(21) Appl. No.: 10/977,705

(22) Filed: Oct. 29, 2004

(65) Prior Publication Data

US 2006/0094378 A1     May 4, 2006

(51) Int. Cl.
    *H04R 25/00*     (2006.01)
(52) U.S. Cl. .................. 381/181; 381/401; 381/396; 381/182; 381/335; 381/410; 379/428.01; 379/433.02; 379/440; 455/90.3; 455/571.5
(58) Field of Classification Search ............ 381/58–59, 381/111, 116–117, 342, 182, 186, 401, 388, 381/357, 150, 97–99, 335, 334, 332, 311, 381/396, 410; 379/428.01, 433.02, 440; 455/90.3, 575.1
See application file for complete search history.

(56) References Cited

U.S. PATENT DOCUMENTS 5,081,674 A  *  1/1992   Wijas et al. ............ 379/433.02

(Continued)

FOREIGN PATENT DOCUMENTS

EP     0 489 551     6/1992

(Continued)

OTHER PUBLICATIONS

Notification of Transmittal of the International Search Report, and the Written Opinion of the International Searching Authority, or the Declaration, corresponding to PCT/US05/014661, mailed Aug. 17, 2005.

*Primary Examiner*—Vivian Chin
*Assistant Examiner*—Disler Paul
(74) *Attorney, Agent, or Firm*—Myers Bigel Sibley & Sajovec, P.A.

(57) ABSTRACT

A mobile terminal includes a portable terminal housing and a speaker housing positioned in the portable terminal housing. The speaker housing includes a first micro-speaker having a first frequency response and a second micro-speaker having a second frequency response and positioned proximate the first micro-speaker. The terminal housing further includes a first passageway extending from a front face of the first micro-speaker to a first opening in the terminal housing, and a second passageway extending from a back face of the second micro-speaker to a second opening in the terminal housing displaced from the first opening. A grommet adjacent the speaker housing acoustically separates at least a portion of the first passageway from the second passageway. The first passageway may be completely acoustically separated from the second passageway by the grommet and/or a gasket and/or a foam structure. The grommet may define a first outlet extending from a front face of the first micro-speaker to a first location on an external surface of the grommet and a second outlet extending from a back face of the second micro-speaker to a second location on the external surface of the grommet that is displaced from the first location, so that the grommet may acoustically separate the second outlet from the first outlet, although complete acoustic isolation may not be possible.

28 Claims, 6 Drawing Sheets

U.S. PATENT DOCUMENTS

| | | | |
|---|---|---|---|
| 5,260,681 A | 11/1993 | Asai et al. | 340/388 |
| 6,363,157 B1* | 3/2002 | Chick | 381/89 |
| 6,389,146 B1 | 5/2002 | Croft, III | 381/345 |
| 6,545,612 B1* | 4/2003 | Lindgren et al. | 340/686.6 |
| 6,639,992 B2* | 10/2003 | Kobayashi et al. | 381/396 |
| 6,766,034 B2* | 7/2004 | Kobayashi et al. | 381/396 |
| 7,062,054 B2* | 6/2006 | Nishikawa et al. | 381/182 |
| 7,113,740 B2* | 9/2006 | Kuchiishi et al. | 455/3.06 |
| 7,142,686 B2* | 11/2006 | Furuya et al. | 381/396 |
| 7,162,050 B2* | 1/2007 | Furuya et al. | 381/351 |
| 7,194,099 B2* | 3/2007 | Lewis | 381/182 |
| 2002/0168074 A1* | 11/2002 | Miyamoto et al. | 381/182 |
| 2004/0071303 A1* | 4/2004 | Furuya et al. | 381/182 |

FOREIGN PATENT DOCUMENTS

| | | |
|---|---|---|
| EP | 1026868 | 8/2000 |
| EP | 1198109 A1 | 4/2002 |
| EP | 1257147 A2 | 11/2002 |
| EP | 1257148 A2 | 11/2002 |
| EP | 1296535 A2 | 3/2003 |
| WO | 02/34006 | 4/2002 |

\* cited by examiner

DUAL-DIAPHRAGM SPEAKER ASSEMBLIES WITH ACOUSTIC PASSAGEWAYS AND MOBILE TERMINALS INCLUDING THE SAME

BACKGROUND OF THE INVENTION

The present invention relates to speaker assemblies for personal use such as in mobile terminals and, more particularly, to dual-diaphragm speaker assemblies.

Manufacturers and designers of personal electronic devices, such as cellular radio telephones, frequently seek to reduce the overall dimensions of such devices while maintaining attractive style characteristics for the devices. One consequence of the reduced size for such devices that include a speaker is that less space may be available for the speaker. Furthermore, a variety of audio signal generation capabilities may be desired in such personal electronic devices including buzzers, voice signal generation and/or music or other audio signal reproduction and playback.

For audio performance in wireless telephony, it is known to use a speaker having relatively uniform frequency characteristics in the 300 hertz (Hz) to 3400 Hz voice frequency band. Where music or other complex signals are provided by the device, a speaker with a frequency range providing a bandwidth up to at least 8000 Hz may be used. In addition, higher sound level alert signals may be provided in various personal electronic devices.

As the space available for the hardware supporting the audio signal generation capabilities decreases in the personal electronic devices, it may become more difficult to support multiple sound emitting output devices and the space available for each such device may become smaller. Furthermore, increased functionality in such personal electronic devices may require more of the reduced available space to be utilized for other functionality of the device. A reduction in the size of the audio output devices may increase the difficulty of providing a desirable loudness level for signals, such as buzzer alert signals. In addition, to the extent features of the audio output device(s) are presented externally on the personal electronic device, the impact of those features on the appearance of the product and/or the flexibility to place such visible features at different locations on the device may become important.

One known type of speaker is a dual-diaphragm speaker, which includes two micro-speakers in a single housing. One speaker may be a receiver speaker with frequency characteristics suited for the voice frequency band and the other may be a speakerphone and/or loudspeaker with an extended frequency range for music and/or other polyphonic signals. A dual-diaphragm speaker is typically positioned in a personal electronic device with the receiver speaker ported (acoustically connected) to the front of the device (toward the user's ear) while the loudspeaker is ported to the back of the device (away from the user's ear). As a result, positioning of the dual-diaphragm speaker in the device may be limited. For example, placement on a printed circuit board of the personal electronic device may be precluded, as the printed circuit board may physically block the output of either the receiver speaker or the loudspeaker. In addition, user dissatisfaction may result if high acoustic levels from the loudspeaker are ported too close to a user's ear.

SUMMARY OF THE INVENTION

Embodiments of the present invention provide micro-speaker assemblies and mobile terminals including micro-speaker assemblies. The mobile terminal includes a portable terminal housing and a speaker housing positioned in the portable terminal housing. The speaker housing includes a first micro-speaker having a first frequency response and a second micro-speaker having a second frequency response. The second micro-speaker is positioned proximate the first micro-speaker. The mobile terminal further includes a first passageway extending from a front face of the first micro-speaker to a first opening in the terminal housing, a second passageway extending from a back face of the second micro-speaker to a second opening in the terminal housing displaced from the first opening and a grommet adjacent the speaker housing that acoustically separates at least a portion of the first passageway from the second passageway. The terminal housing may acoustically separate remaining portions of the first passageway from the second passageway.

In other embodiments of the present invention, the first passageway is completely acoustically separated from the second passageway. The grommet may completely acoustically separate the first passageway from the second passageway. Alternatively, the first passageway may be completely acoustically separated from the second passageway by the grommet, a gasket and/or a foam structure.

In further embodiments of the present invention, the back face of the second micro-speaker faces a back face of the first micro-speaker. Also, the first opening in the terminal housing may be an earpiece opening in a front side of the terminal housing. The front face of the first micro-speaker can be positioned proximate and facing the front side of the terminal housing and the first micro-speaker can be positioned between the front side of the terminal housing and the second micro-speaker.

In other embodiments of the present invention, the first micro-speaker is a receiver and the second micro-speaker is a loudspeaker. The first opening in the terminal housing may be an earpiece opening of the mobile terminal, and the second opening in the terminal housing may be displaced from the earpiece opening by a distance selected to provide a desired attenuation in a vicinity of the earpiece opening for sounds generated by the loudspeaker. The earpiece opening can be in a front side of the terminal housing and the second opening can be in a different side of the terminal housing, such as an adjacent side of the terminal housing.

In further embodiments of the present invention, the mobile terminal includes an antenna board positioned in the terminal housing adjacent a back side of the terminal housing. The mobile terminal may further include a printed circuit board positioned in the terminal housing, wherein the antenna board may be electrically coupled to the printed circuit board. The first and second micro-speakers may be electrically coupled to the printed circuit board, and the speaker housing may be positioned between the printed circuit board and the antenna board. The antenna board can be positioned between a back side of the printed circuit board and the back side of the terminal housing, and the front face of the first micro-speaker can be positioned proximate the back side of the printed circuit board. A keypad and/or a display may also be positioned on a front side of the printed circuit board.

In other embodiments of the present invention, the first passageway includes an opening in the printed circuit board and the front face of the first micro-speaker is proximate the opening in the printed circuit board on the back side of the printed circuit board. Also, the grommet may be configured to provide a seal on the back side of the printed circuit board between the speaker housing and the printed circuit board around the opening in the printed circuit board. In particular, the grommet may be configured to provide a seal between the printed circuit board and an external surface of the speaker housing proximate the front face of the first micro-speaker around the opening in the printed circuit board. Alternatively, the mobile terminal may include a gasket configured to define a further portion of the first passageway on the back side of the printed circuit board extending over an offset distance from the opening in the printed circuit board to the front face of the first micro-speaker. The gasket may be configured to provide a seal between the printed circuit board and the grommet around the opening in the printed circuit board, and the grommet may be configured to provide a seal between the speaker housing and the gasket.

In further embodiments of the present invention, the grommet is configured to provide a seal between the speaker housing and the first passageway adjacent the front face of the first micro-speaker and between the speaker housing and the second passageway adjacent the back face of the second micro-speaker. Also, the first passageway may include a first outlet from the front face of the first micro-speaker to a first location on an external surface of the grommet, and the second passageway may include a second outlet from the back face of the second micro-speaker to a second location on the external surface of the grommet, so that the second outlet is acoustically separated from the first outlet by the grommet. Additionally, the second outlet can extend circumferentially around the first micro-speaker. The outer plastic housing of the first and second micro-speakers and the grommet may be designed to enhance the sealing and acoustical isolation of each outlet path.

In other embodiments of the present invention, the first micro-speaker is tuned to provide a first amplitude response and the second micro-speaker is tuned to provide a second amplitude response, such that the second amplitude response is greater than the first amplitude response and the frequency range of the second micro-speaker is greater than the frequency range of the first micro-speaker. The first amplitude response may be tuned for an earpiece receiver and the second amplitude response may be tuned for a loudspeaker and/or an alert frequency and/or a polyphonic speaker. A minimum of the first amplitude response can be at least about 20 decibels (dB) Pascal per volt in the voice frequency range. Also, the second micro-speaker may be tuned to provide a minimum second amplitude response of about 70 decibels of sound pressure level (dB SPL) per watt per meter up to about 8000 hertz (Hz) and an amplitude response greater than the minimum second amplitude response at an alert frequency.

In further embodiments of the present invention, the first micro-speaker is tuned to provide a frequency response in a voice frequency range and the second micro-speaker is tuned to provide a frequency response in an extended frequency range that is broader than the voice frequency range. The voice frequency range can be from about 300 hertz (Hz) to about 3400 Hz, and the extended frequency range can be up to at least 8000 Hz. Also, the first micro-speaker may have a bandwidth of at least 4000 hertz (Hz), and the second micro-speaker may have a bandwidth of at least 10000 Hz. The speaker housing may have a maximum diameter of between about 10 millimeters (mm) and about 20 mm.

In further embodiments of the present invention, a micro-speaker assembly includes a housing, a first micro-speaker within the housing having a first frequency response, a second micro-speaker within the housing having a second frequency response different from the first frequency response and positioned proximate the first micro-speaker, and a grommet adjacent the housing. The grommet defines a first outlet extending from a front face of the first micro-speaker to a first location on an external surface of the grommet and a second outlet extending from a back face of the second micro-speaker to a second location on the external surface of the grommet that is displaced from the first location, such that the grommet acoustically separates the second outlet from the first outlet. However, it should be noted that complete acoustic separation may not be feasible, as will be discussed in detail below.

DETAILED DESCRIPTION OF EMBODIMENTS OF THE INVENTION

Figure 1:
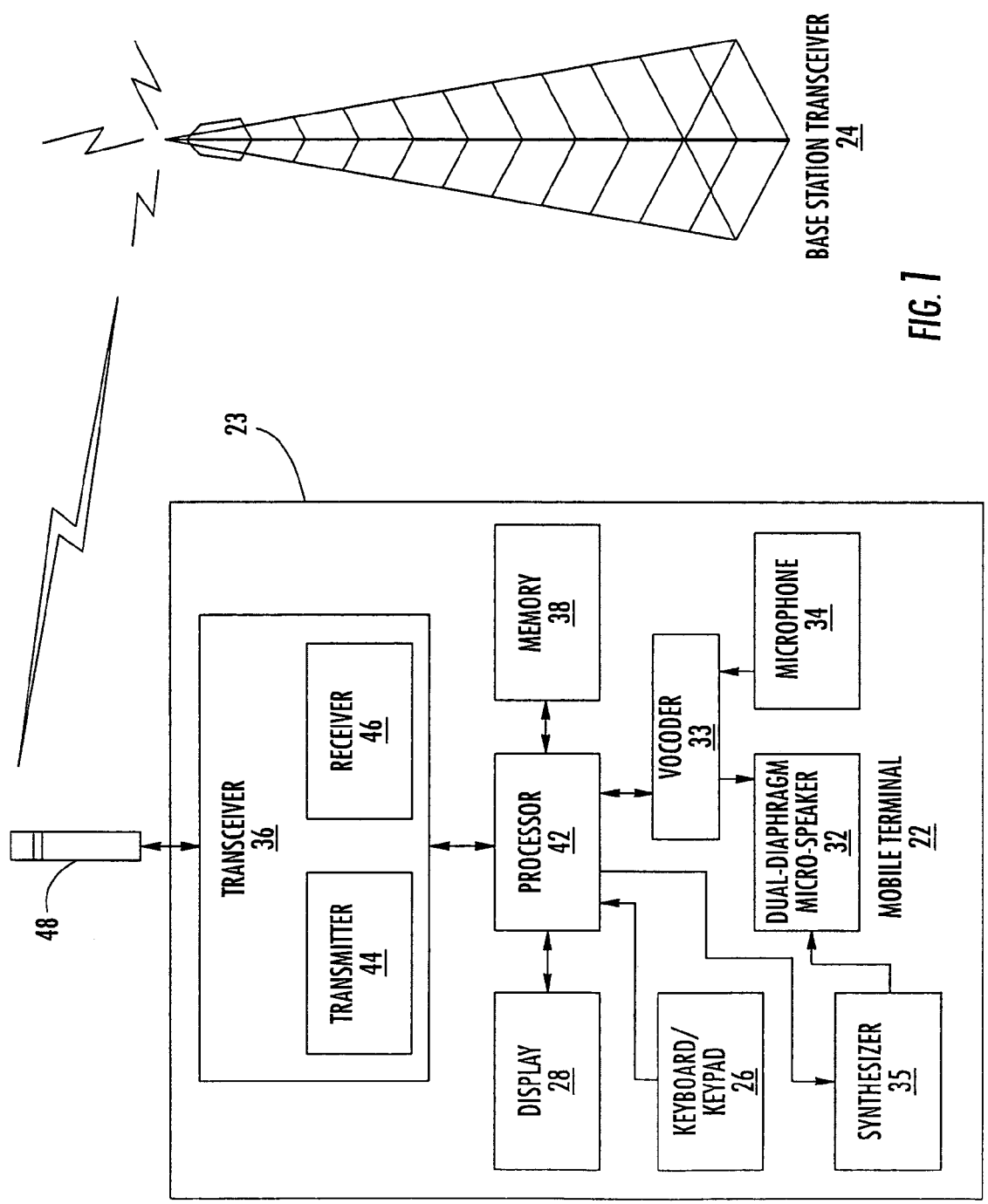
FIG. 1 is a schematic block diagram illustrating a mobile terminal including a dual-diaphragm micro-speaker assembly according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art. It will be understood that the term "and/or" as used herein refers to and encompasses any and all possible combinations of one or more of the associated listed items.

In addition, spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will also be understood that although the terms first and second are used herein to describe various speakers, openings and/or locations, these speakers, openings and/or locations should not be limited by these terms. These terms are only used to distinguish one speaker, opening or location from another speaker, opening or location. Thus, a first speaker, opening or location discussed below could be termed a second speaker, opening or location, and similarly, a second speaker, opening or location may be termed a first speaker, opening or location without departing from the teachings of the present invention.

The present invention is described below with reference to block diagrams of mobile terminals and/or speaker assemblies according to embodiments of the invention. Embodiments of the present invention will now be described with reference to the schematic block diagram illustration of a mobile terminal in FIG. 1.

FIG. 1 illustrates an exemplary radiotelephone communication system including a mobile terminal 22 in accordance with some embodiments of the present invention and a base station transceiver 24 of a wireless communications network. The mobile terminal 22 includes a terminal housing 23 and may include a keyboard/keypad 26, a display 28, a dual-diaphragm micro-speaker assembly 32, a microphone 34, a transceiver 36 and a memory 38 that communicate with a controller/processor 42. The transceiver 36 typically includes a transmitter circuit 44 and a receiver circuit 46, which respectively transmit outgoing radio frequency signals to the base station transceiver 24 and receive incoming radio frequency signals, such as voice signals, from the base station transceiver 24 via an antenna 48. The radio frequency signals transmitted between the mobile terminal 22 and the base station transceiver 24 may include both traffic and control signals (e.g., paging signals/messages for incoming calls), which are used to establish and maintain communication with another party or destination. The controller/processor 42 may support various functions of the mobile terminal 22, including decoding received voice signals from the receiver circuit 46 and providing the decoded voice signals to the dual-diaphragm micro-speaker assembly 32. As shown in FIG. 1, musical instrument digital interface (MIDI) signals may be supplied to the dual-diaphragm micro-speaker assembly 32 by a MIDI synthesizer 35, for example, for alerting and/or user feedback. Alternatively, synthesizers for other formats may be provided.

The foregoing components of the mobile terminal 22, other than the dual-diaphragm micro-speaker assembly 32 and aspects related thereto, may be included in many conventional mobile terminals and their functionality is generally known to those skilled in the art. It should be further understood, that, as used herein, the term "mobile terminal" may include a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; and a conventional laptop and/or palmtop portable computer, that may include a radiotelephone transceiver, or other portable device using a micro-speaker in a space constrained housing configuration.

Still referring to FIG. 1, in some embodiments of the present invention, the base station transceiver 24 includes the radio transceiver(s) that define an individual cell in a cellular network and communicate with the mobile terminal 22 and other mobile terminals in the cell using a radio-link protocol. Although only a single base station transceiver 24 is shown, it will be understood that many base station transceivers may be connected through, for example, a mobile switching center and other devices to define a wireless communications network.

Although the present invention may be embodied in communication devices or systems, such as the mobile terminal 22, the present invention is not limited to such devices and/or systems. Instead, the present invention may be embodied in any apparatus that utilizes a dual-diaphragm micro-speaker.

Figure 2A:
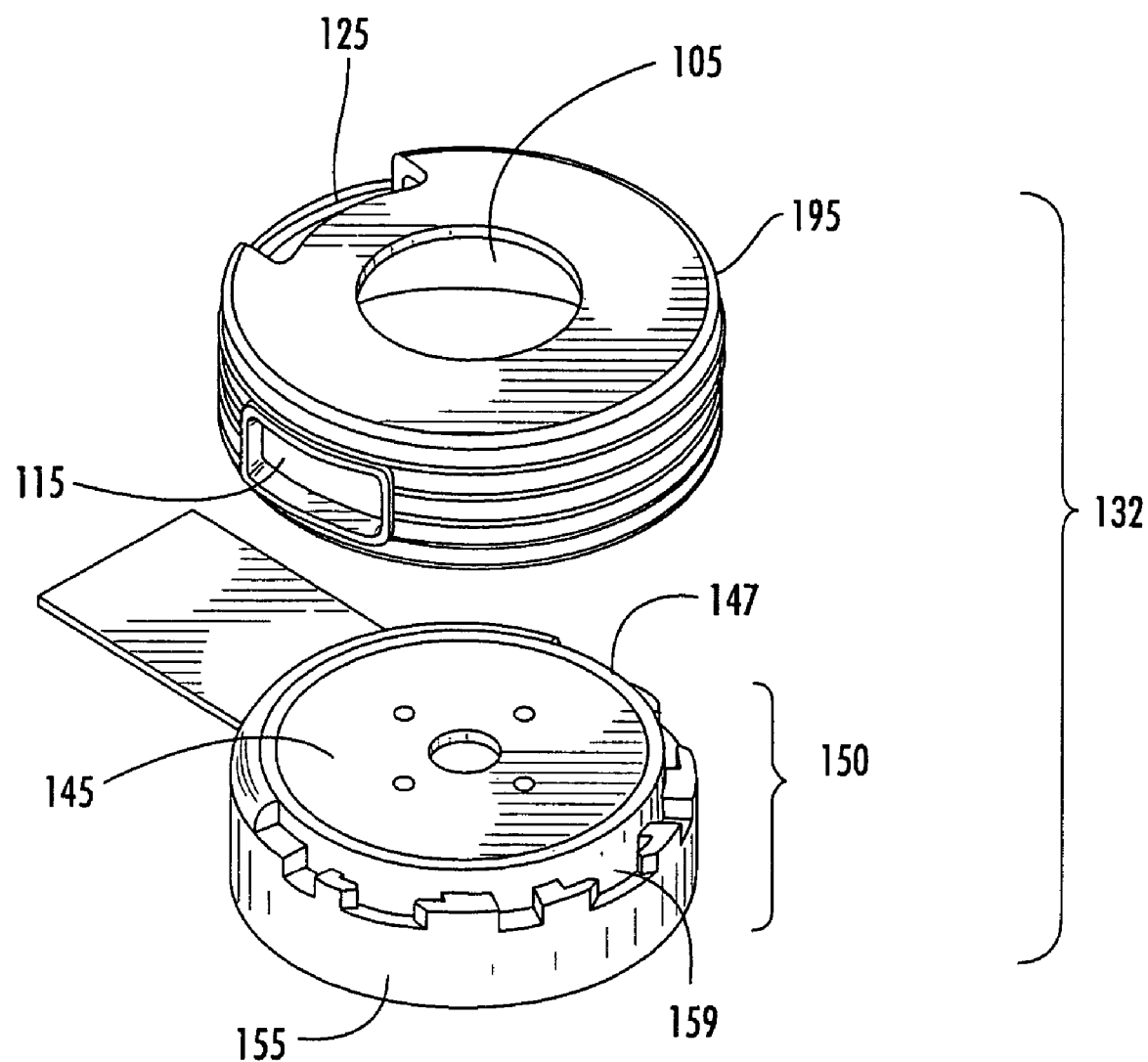
FIG. 2A is a perspective view of a micro-speaker assembly according to some embodiments of the present invention.
Figure 2B:
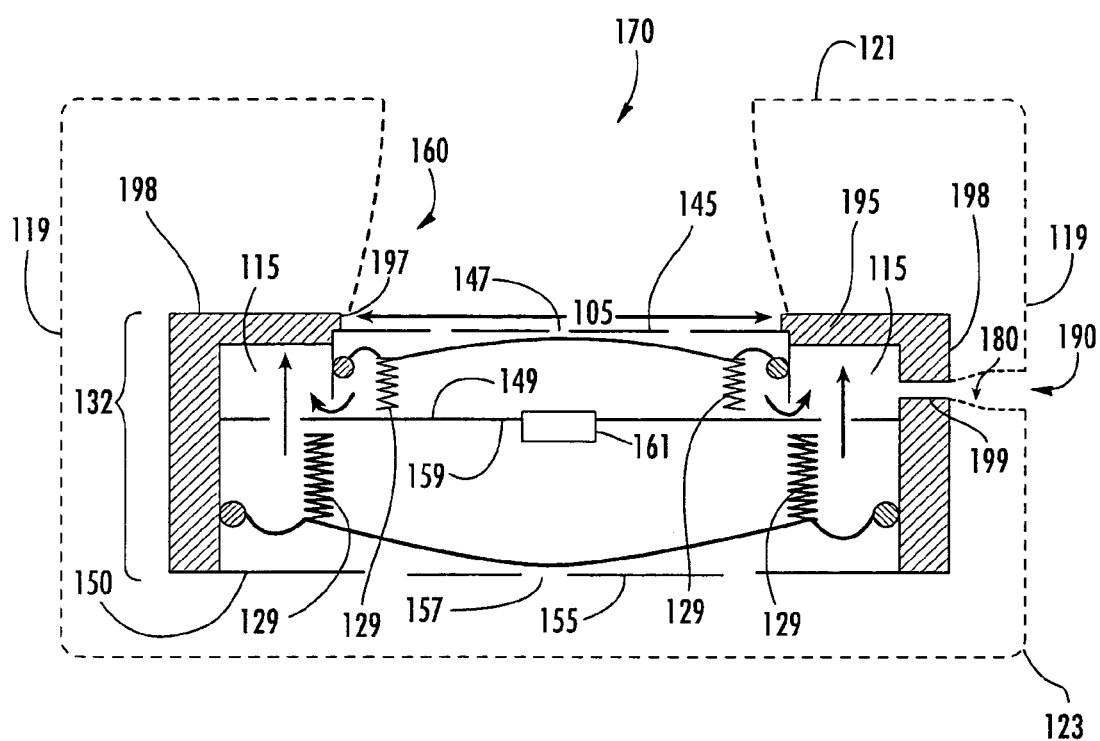
FIG. 2B is a schematic cross-section illustrating a micro-speaker assembly according to some embodiments of the present invention.

A dual-diaphragm micro-speaker assembly according to embodiments of the present invention will now be further described with reference to FIGS. 2A-2B. As shown in the embodiments of FIGS. 2A and 2B, the dual-diaphragm micro-speaker assembly 132 includes a speaker housing 150 and a grommet 195. The speaker housing 150 includes a first micro-speaker 145 and a second micro-speaker 155 adjacent the first micro-speaker. The first micro-speaker 145 may be tuned to provide different frequency response than the second micro-speaker 155. For example, the first micro-speaker 145 may be a receiver/earpiece speaker, and the second micro-speaker 155 may be a loudspeaker or other polyphonic speaker.

The grommet 195 may be configured to fit over the speaker housing 150 and provide a seal with the speaker housing 150 adjacent a front face 147 of the first micro-speaker 145 and adjacent a back face 159 of the second micro-speaker 155. The grommet 195 may be compressible to facilitate sealable engagement with the speaker housing 150. The grommet 195 may also define a first outlet 105 for sound from the first micro-speaker 145 and a second outlet 115 for sound from the second micro-speaker 155. The grommet may further include a connector opening 125 to provide for routing of a wire or other signal-carrying member to the first and second micro-speakers 145 and 155. The connector opening 125 may be acoustically separated from the first outlet 105 and the second outlet 115. The connector opening 125 may also be configured to seal around the wire or signal-carrying member routed through the connector opening 125. Moreover, although the connector opening 125 is shown at a particular location on the grommet 195 in FIG. 2A, the connector opening 125 is not limited to such a location and may be located elsewhere in further embodiments according to the present invention. In addition, other connection methods, such as elastomeric connections, may be used to enhance sealing around the connector opening 125 depending on the design of the grommet 195 and/or dual-diaphragm micro-speaker assembly 132.

FIG. 2B is a schematic cross-sectional view of the dual-diaphragm micro-speaker assembly 132 positioned in a mobile terminal housing 123 according to some embodiments of the present invention. Referring to FIG. 2B, the dual-diaphragm micro-speaker assembly 132 includes a first micro-speaker 145 and a second micro-speaker 155 positioned within the speaker housing 150 in the terminal housing 123.

Only a portion of the terminal housing 123 is shown in FIG. 2B, and the terminal housing 123 generally includes other components that are not illustrated in FIG. 2B.

The first micro-speaker 145 includes a front face 147 and a back face 149 positioned opposite from the front face 147. The second micro-speaker 155 also includes a front face 157 and a back face 159 positioned opposite from the front face 157. The back face 159 of the second micro-speaker 155 is positioned facing the back face 149 of the first micro-speaker 145 in the embodiments of FIG. 2B. Each micro-speaker also includes a diaphragm, such that the front face of each diaphragm is positioned adjacent the front face of each micro-speaker. As such, a single magnetic package 161 may be shared between the first micro-speaker 145 and the second micro-speaker 155. Each micro-speaker may also include voice coils 129, as well as a cloth filter positioned adjacent its front face and/or back face that provides debris filtration. The speaker housing 150 may be positioned in the terminal housing 123 such that the front face 147 of the first micro-speaker 145 is adjacent a front side 121 of the terminal housing 123 and is positioned between the front side 121 of the terminal housing 123 and the back face 159 of the second micro-speaker 155.

The terminal housing 123 in the illustrated embodiments includes a first passageway 160, which extends from the front face 147 of the first micro-speaker 145 to a first opening 170 in the terminal housing 123, and a second passageway 180, which extends from the back face 159 of the second micro-speaker 155 to a second opening 190 in the terminal housing 123. The first opening 170 may be an earpiece opening for a mobile terminal, and the second opening 190 may be displaced from the earpiece opening by a distance selected to provide a desired attenuation in a vicinity of the earpiece opening. For example, the earpiece opening may be positioned on a front side 121 of the terminal housing 123 so that sound from a receiver speaker is ported to the user's ear, and the second opening 190 may be positioned on a different side of the terminal housing 123, such as an adjacent side 119, so that sound from a loudspeaker is ported away from the user's ear.

Still referring to the embodiments of FIG. 2B, the grommet 195 is positioned adjacent the speaker housing 150 such that the grommet 195 acoustically separates at least a portion of the first passageway 160 from the second passageway 180. The grommet 195 may be configured to provide a seal between the speaker housing 150 adjacent the front face 147 of the first micro-speaker 145 and the first passageway 160, and between the speaker housing 150 adjacent the back face 159 of the second micro-speaker 155 and the second passageway 180. The grommet 195 may further define a first outlet portion 105 of the first passageway 160. The first outlet portion 105 may be between the front face 147 of the first micro-speaker 145 and a first location 197 at an external surface 198 of the grommet 195. The grommet 195 may also further define a second outlet portion 115 of the second passageway 180. The second outlet portion 115 may be between the back face 159 of the second micro-speaker 155 and a second location 199 at the external surface 198 of the grommet 195. The second outlet 115 may be acoustically separated from the first outlet 105 by the grommet 195. The second outlet 115 may be positioned such that it surrounds the first micro-speaker 145.

It should be noted that complete acoustic isolation between the first and second outlets may be exceedingly difficult to implement, and as such, may not be feasible. Accordingly, embodiments of the present invention as described herein may not provide complete acoustic isolation between the first and second outlets. Rather, isolation between the two outlets, when carefully designed and constructed, may result in attenuation of the amount of acoustic coupling from one outlet path to another. The amount of attenuation achieved may be limited by the specific type and structure of the dual-diaphragm micro-speaker and the design and quality of the sealing around each acoustic path. For example, different dual-diaphragm micro-speakers may have significant differences in their designs, resulting in different amounts of isolation in each.

It should further be noted that embodiments of the present invention alone as described herein do not automatically provide necessary limitation and/or mitigation of sound pressure levels. As such, it may be important to understand the amount of attenuation between outlets provided by particular embodiments and to properly set audio output levels in each outlet path to levels that provide the necessary sound pressure level (SPL) limitation for users of the device. In order to achieve proper SPL margins for users, the attenuation levels may be established via careful acoustic testing and design of particular embodiments. Once attenuation levels are established, properly limited audio output levels (based on established acoustic standards such as IEC, OSHA, etc.), may be implemented for particular embodiments.

The dual-diaphragm micro-speaker assembly 132 may be used as a dual-diaphragm micro-speaker assembly 32 in a mobile terminal 22 such as illustrated in FIG. 1. It is to be further understood that, while the illustration of FIG. 2B shows a second opening 190 on the adjacent side 119 of the terminal housing 123, the invention is not limited to such a porting and may also be ported to another side of the mobile terminal 22, for example, to avoid high sound levels at an earpiece opening and/or to provide a desired attenuation at the earpiece opening of the mobile terminal 22 without having an unacceptable impact on the frequency response of the first and second micro-speakers 145 and 155. In further embodiments of the present invention, it will be understood that the first and second micro-speakers 145 and 155 may be ported through or integrated into other hardware of the mobile terminal 22, as well as the configuration illustrated in FIG. 2B.

The speaker housing 150, in various embodiments of the present invention, has a diameter of between about 10 millimeters (mm) and about 20 mm. In other embodiments, the first and second openings 170 and 190 may each have an area of less than about 10 square millimeters (mm$^2$). Such a small port size may be about half the size, or less, of typical existing porting strategies for micro-speakers. The use of such smaller porting size openings for the first and second openings 170 and 190 may, for example, be desirable to reduce interference or detraction from the appearance of the mobile terminal 22 or other device in which the dual-diaphragm micro-speaker assembly 132 is located. These dimensions may ultimately be determined based on the design of a particular embodiment.

Figure 3:
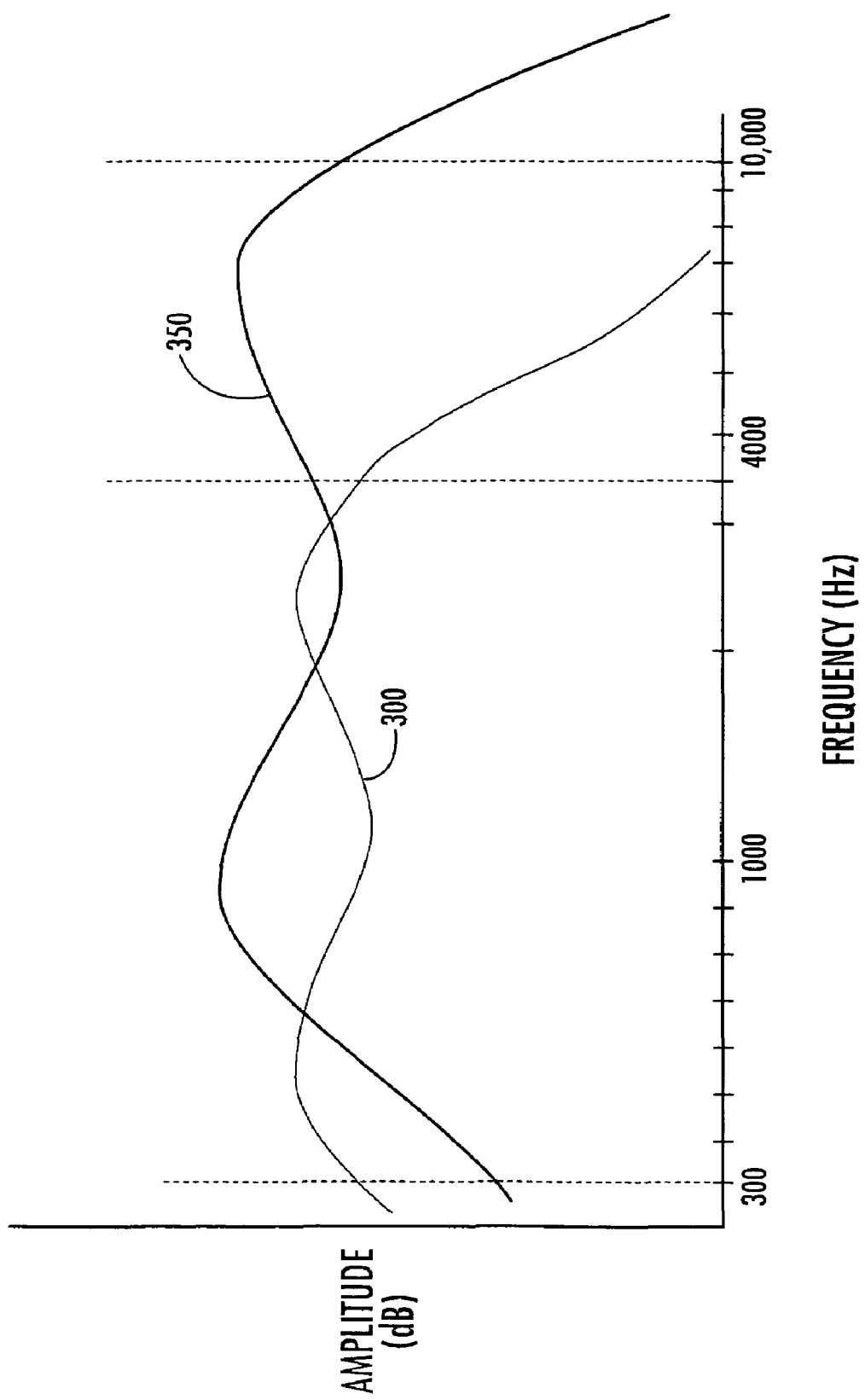
FIG. 3 is a graph illustrating a frequency response of a first and second micro-speaker in a dual-diaphragm micro-speaker assembly according to some embodiments of the present invention.

FIG. 3 is a graph illustrating frequency response characteristics of the first and second micro-speakers in the dual-diaphragm micro-speaker assembly illustrated in FIGS. 2A and 2B. For the embodiments illustrated in FIG. 3, the first micro-speaker 145 is tuned to provide a relatively uniform frequency response in the voice frequency band, as shown by curve 300. Since the voice frequency band in wireless telephony typically ranges from about 300 hertz to about 3400 hertz, the first micro-speaker 145 is tuned for a bandwidth of about 4000 hertz. As such, the first micro-speaker 145 may be used as an earpiece receiver speaker for the mobile terminal. The first micro-speaker 145 may also be tuned to provide an amplitude response in the voice frequency range that is suitable for an earpiece receiver. The amplitude response in the voice frequency range may be at least about 20 decibels (dB) Pascal per volt when measured into an artificial ear coupler.

Still referring to the embodiments of FIG. 3, the second micro-speaker 155 is tuned to provide a frequency response in an extended frequency range above the wireless telephony voice frequency band, as shown by curve 350. The extended frequency range may expand to at least about 8000 hertz or, as shown in FIG. 3, to at least about 10,000 hertz. Such an extended frequency response may support, for example, polyphonic ring tone and melodies (such as from a MIDI synthesizer or MP3 file playback or the like). As such, the second micro-speaker 155 may be used as a loudspeaker for the mobile terminal. The second micro-speaker 155 may also be tuned to provide an amplitude response greater than that of the first micro-speaker 145 in the extended frequency range. The minimum amplitude response in the extended frequency range may be about 70 decibels of sound pressure level (dB SPL) per watt per meter. The second micro-speaker 155 may also be tuned for a higher amplitude response, greater than the response at the voice frequency range, at an alert frequency. Such an alert frequency may support high alerting ring levels.

A dual-diaphragm micro-speaker assembly in accordance with various embodiments of the present invention may support high alerting ring levels while maintaining adequate level frequency response for speaker phone/loudspeaker mode in the voice frequency range as well as extending frequency response bandwidth for polyphonic melodies (MIDI, MP3, etc.). Such a frequency response may be provided without requiring the use of a large opening size from the housing of the micro-speaker assembly and, further, while allowing high sound levels in mobile terminal design to be addressed through porting of the loudspeaker to the top or side of the mobile terminal away from an earpiece. Furthermore, the porting of the dual-diaphragm speaker may, in various embodiments, be provided through the main antenna or other features of the mobile terminal such as a printed circuit board (PCB) of the mobile terminal, as will be discussed in greater detail below.

Figure 4:
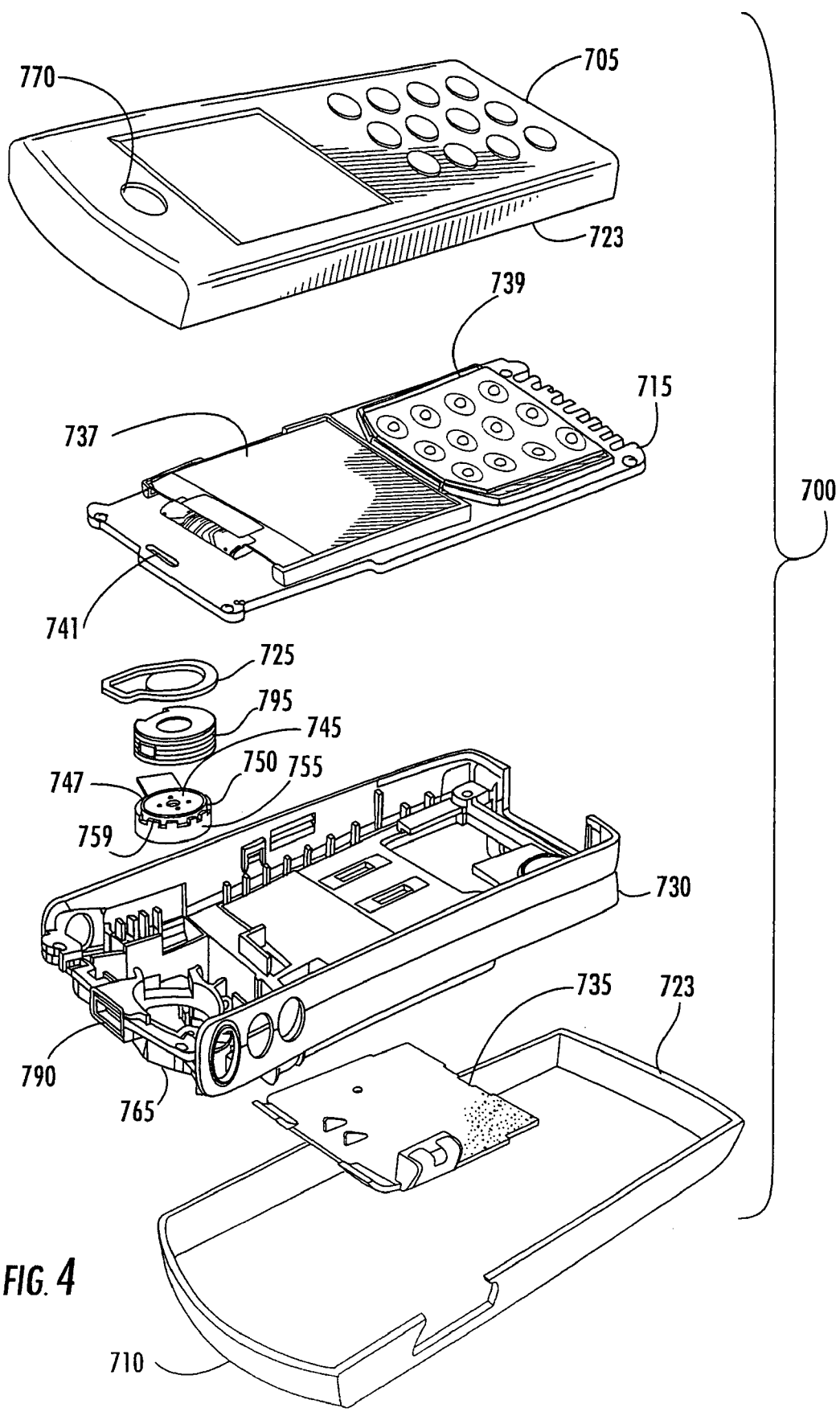
FIG. 4 is an exploded perspective view of a mobile terminal including a dual-diaphragm micro-speaker assembly according to some embodiments of the present invention.

Further embodiments of the present invention will now be described with reference to FIGS. 4-5. FIG. 4 is an exploded perspective view of a mobile terminal 700 including a dual-diaphragm micro-speaker assembly according to various embodiments of the present invention. As illustrated in FIG. 4, the mobile terminal 700 includes a front cover 705 and a back cover 710 that mate with the mounting member 730 to define a terminal housing 723 of the mobile terminal 700. A printed circuit board 715, a speaker housing 750, a grommet 795, a gasket 725 and an antenna board 735 may be positioned in the terminal housing 723.

The printed circuit board 715 may be positioned in the terminal housing 723 between the mounting member 730 and the front cover 705. The printed circuit board 715 may include user input/output devices such as a display 737 and a keyboard or keypad 739 on the front side of the printed circuit board 715. An earpiece opening 770 in the terminal housing 723 at the front cover 705 may provide an outlet for sound from a first micro-speaker 745 in the speaker housing 750. A loudspeaker opening 790 in the terminal housing 723 may provide a separate outlet for alert frequencies and/or polyphonic signals from a second micro-speaker 755 in the speaker housing 750. The loudspeaker opening 790 may be in the mounting member 730, or in a different side of the terminal housing 723.

Figure 5:
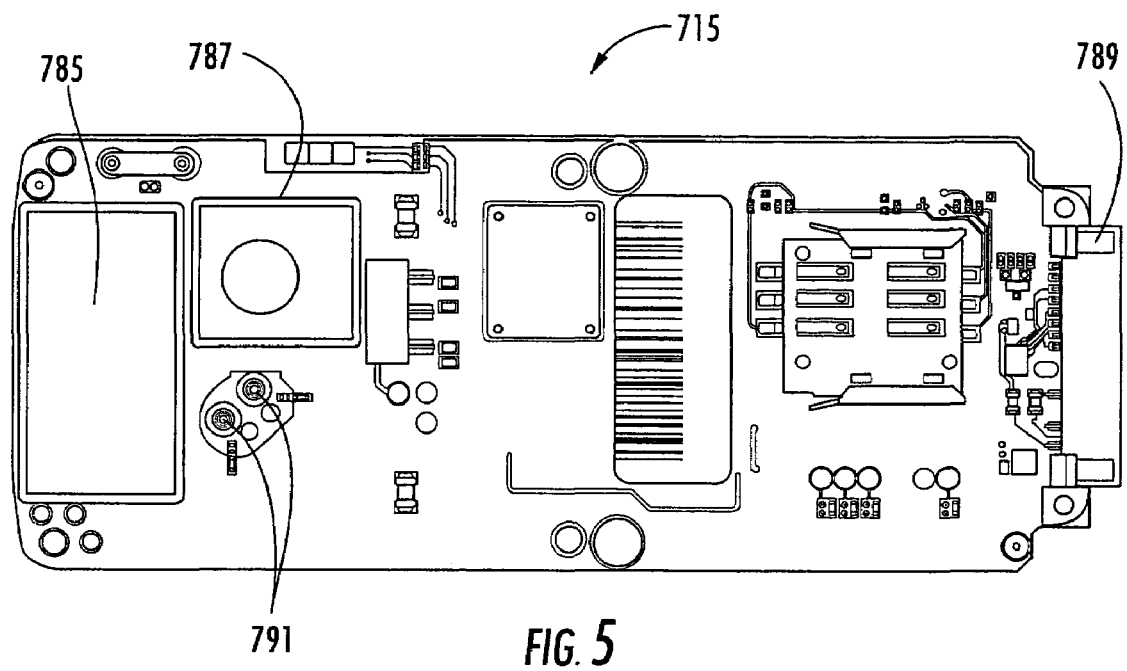
FIG. 5 is a plane view of a printed circuit board as used in a mobile terminal according to some embodiments of the present invention.

As shown in FIG. 5, the printed circuit board 715 may include various components associated with the backside of the printed circuit board 715. A receiver 785 that receives voice signals from a wireless communications network is illustrated mounted on the backside of the printed circuit board 715. A controller 787 decodes the voice signals and provides the decoded voice signals to a first micro-speaker 745 and/or a second micro-speaker 755 in the speaker housing 750 of FIG. 4. A system connector 789 on the printed circuit board 715 extends through the housing of the mobile terminal 700 to allow access to the circuitry on the printed circuit board 715, for example, for use by an auxiliary component coupled to the system connector 789. In addition, spring connectors or contacts 791 on the backside of the printed circuit board 715 may electrically couple the first 745 and second 755 micro-speakers to the backside of the printed circuit board 715.

Referring again to FIG. 4, the printed circuit board 715 may include an opening 741 that forms a portion of a passageway from the earpiece opening 770 in the front cover 705 to the speaker housing 750. A gasket 725 may further define the passageway from the earpiece opening 770 to the speaker housing 750, and provide a seal between the back side of the printed circuit board 715 (around the opening 741 in the printed circuit board 715) and the grommet 795. The grommet 795 may be configured to receive the speaker housing 750 and provide a seal between the gasket 725 and the speaker housing 750. Alternatively, in some embodiments, the grommet 795 may directly provide a seal around the opening 741 between the back side of the printed circuit board 715 and the speaker housing 750.

The grommet 795 may form a seal on the speaker housing 750 adjacent the front face 747 of the first micro-speaker 745 to define part of an acoustic passageway from the first micro-speaker 745 to the earpiece opening 770. The grommet 795 may also form a seal on the speaker housing 750 adjacent the back face 759 of the second micro-speaker 755 to define part of a separate acoustic passageway from the second micro-speaker 755 to the loudspeaker opening 790 in the terminal housing 723. As such, the grommet 795 may acoustically separate the first micro-speaker output from the second micro-speaker output.

As also shown in the embodiments of FIG. 4, the antenna board 735, which may be electrically coupled to the printed circuit board 715, may be positioned adjacent the back side of the printed circuit board 715. The speaker housing 750 may be positioned between the printed circuit board 715 and the antenna board 735. The antenna board 735 may be substantially parallel to the printed circuit board 715.

The mounting member 730 may be an insulating material such as Cycoloy® available from GE Plastics. The grommet 795 and gasket 725 may also be an insulating material and may be a more compliant material, such as silicon rubber, to facilitate sealable engagement of the speaker housing 750 with the grommet 795 and to facilitate placement of the grommet 795 and the speaker housing 750 into a mating receptacle 765 in the mounting member 730. Adhesives may also be used to facilitate sealable engagement, depending on assembly and sealing constraints. Furthermore, while various electronic circuits, such as the receiver 785 and controller 787 are shown as mounted on specific faces of the printed circuit board 715, it is to be understood that they may be positioned on different sides of the printed circuit board 715 in various embodiments of the present invention.

As is clear from the description above, embodiments of the present invention provide for placement of a dual-diaphragm micro-speaker assembly in a mobile terminal housing. The front face of the first micro-speaker is acoustically connected to a first opening in the terminal housing, and the back face of the second micro-speaker is acoustically connected to a second opening in the terminal housing such that separate acoustic passageways may be provided for each speaker. Such an orientation may facilitate positioning of the dual-diaphragm speaker housing on a backside of the printed circuit board. Various embodiments of the present invention further provide for flexibility in porting of the micro-speakers, such as to adjacent sides of the mobile terminal housing, which may provide for sound generation from a polyphonic speaker for entertainment purposes while limiting the acoustic levels ported to a user's earpiece to some degree.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A mobile terminal, comprising:
   a portable terminal housing;
   a speaker housing positioned in the portable terminal housing, comprising:
      a first micro-speaker having a first frequency response; and
      a second micro-speaker having a second frequency response, wherein the second micro-speaker is positioned proximate the first micro-speaker;
   a printed circuit board having an opening therein positioned in the terminal housing;
   a first passageway extending from a front face of the first micro-speaker to a first opening in the terminal housing, wherein the first passageway includes the opening in the printed circuit board;
   a second passageway extending from a back face of the second micro-speaker to a second opening in the terminal housing displaced from the first opening; and
   a grommet adjacent the speaker housing that acoustically separates at least a portion of the first passageway from the second passageway, wherein the grommet is configured to provide a seal between the speaker housing and the printed circuit board around the opening in the printed circuit board.

2. The mobile terminal of claim 1, wherein the first passageway is completely acoustically separated from the second passageway.

3. The mobile terminal of claim 2, wherein the grommet completely acoustically separates the first passageway from the second passageway.

4. The mobile terminal of claim 2, wherein the first passageway is completely acoustically separated from the second passageway by the grommet, a gasket and/or a foam structure.

5. The mobile terminal of claim 1, wherein the back face of the second micro-speaker faces a back face of the first micro-speaker.

6. The mobile terminal of claim 5, wherein the first opening comprises an earpiece opening in a front side of the terminal housing, wherein the front face of the first micro-speaker is positioned proximate and facing the front side of the terminal housing and wherein the first micro-speaker is positioned between the front side of the terminal housing and the second micro-speaker.

7. The mobile terminal of claim 1, wherein the first micro-speaker is a receiver and wherein the second micro-speaker is a loudspeaker.

8. The mobile terminal of claim 7, wherein the first opening in the terminal housing is an earpiece opening of the mobile terminal and wherein the second opening in the terminal housing is displaced from the earpiece opening by a distance selected to provide a desired attenuation in a vicinity of the earpiece opening for sounds generated by the loudspeaker.

9. The mobile terminal of claim 8, wherein the earpiece opening is in a front side of the terminal housing and wherein the second opening is in a different side of the terminal housing.

10. The mobile terminal of claim 9, wherein the second opening is in an adjacent side of the terminal housing.

11. The mobile terminal of claim 6, further comprising an antenna board positioned in the terminal housing adjacent a back side of the terminal housing.

12. The mobile terminal of claim 11, wherein the antenna board is electrically coupled to the printed circuit board, wherein the first and second micro-speakers are electrically coupled to the printed circuit board and wherein the speaker housing is positioned between the printed circuit board and the antenna board.

13. The mobile terminal of claim 12, wherein the antenna board is positioned between a back side of the printed circuit board and the back side of the terminal housing, wherein the front face of the first micro-speaker is positioned proximate the back side of the printed circuit board and wherein a keypad and/or a display are positioned on a front side of the printed circuit board.

14. The mobile terminal of claim 13, wherein the front face of the first micro-speaker is proximate the opening in the printed circuit board on the back side of the printed circuit board.

15. The mobile terminal of claim 14, wherein the grommet is configured to provide a seal on the back side of the printed circuit board.

16. The mobile terminal of claim 14, further comprising a gasket configured to define a further portion of the first passageway on the back side of the printed circuit board extending over an offset distance from the opening in the printed circuit board to the front face of the first micro-speaker, wherein the gasket is configured to provide a seal between the printed circuit board and the grommet around the opening in the printed circuit board and wherein the grommet is configured to provide a seal between the speaker housing and the gasket.

17. The mobile terminal of claim 1, wherein the grommet is configured to provide a seal between the speaker housing and the first passageway adjacent the front face of the first micro-speaker and between the speaker housing and the second passageway adjacent the back face of the second micro-speaker.

18. The mobile terminal of claim 1, wherein the grommet is configured to provide a seal between the printed circuit board and an external surface of the speaker housing proximate the front face of the first micro-speaker around the opening in the printed circuit board.

19. The mobile terminal of claim 1, wherein the first passageway includes a first outlet from the front face of the first micro-speaker to a first location on an external surface of the grommet and wherein the second passageway includes a second outlet from the back face of the second micro-speaker to a second location on the external surface of the grommet, wherein the second outlet is acoustically separated from the first outlet by the grommet.

20. The mobile terminal of claim 19, wherein the second outlet extends circumferentially around the first micro-speaker.

21. The mobile terminal of claim 1, wherein the first micro-speaker is tuned to provide a first amplitude response and wherein the second micro-speaker is tuned to provide a second amplitude response, wherein the second amplitude response is greater than the first amplitude response and wherein the frequency range of the second micro-speaker is greater than a frequency range of the first micro-speaker.

22. The mobile terminal of claim 21, wherein the first amplitude response is tuned for an earpiece receiver and wherein the second amplitude response is tuned for a loudspeaker and/or an alert frequency and/or a polyphonic speaker.

23. The mobile terminal of claim 22, wherein a minimum of the first amplitude response is at least about 20 decibels (dB) Pascal per volt in the voice frequency range and wherein the alert frequency is between about 3000 hertz (Hz) and about 4000 Hz.

24. The mobile terminal of claim 21 wherein the second micro-speaker is tuned to provide a minimum second amplitude response of about 70 decibels of sound pressure level (dB SPL) per watt per meter up to about 8000 hertz (Hz) and an amplitude response greater than the minimum second amplitude response at an alert frequency.

25. The mobile terminal of claim 1, wherein the first micro-speaker is tuned to provide a frequency response in a voice frequency range and wherein the second micro-speaker is tuned to provide a frequency response in an extended frequency range above the voice frequency range.

26. The mobile terminal of claim 25, wherein the voice frequency range is from about 300 hertz (Hz) to about 3400 Hz, and wherein the extended frequency range is up to at least 8000 Hz.

27. The mobile terminal of claim 1, wherein the first micro-speaker has a bandwidth of at least 4000 hertz (Hz) and the second micro-speaker has a bandwidth of at least 10000 Hz.

28. The mobile terminal of claim 1, wherein the speaker housing has a maximum diameter of between about 10 millimeters (mm) and about 20 mm.

* * * * *